Figure 1:
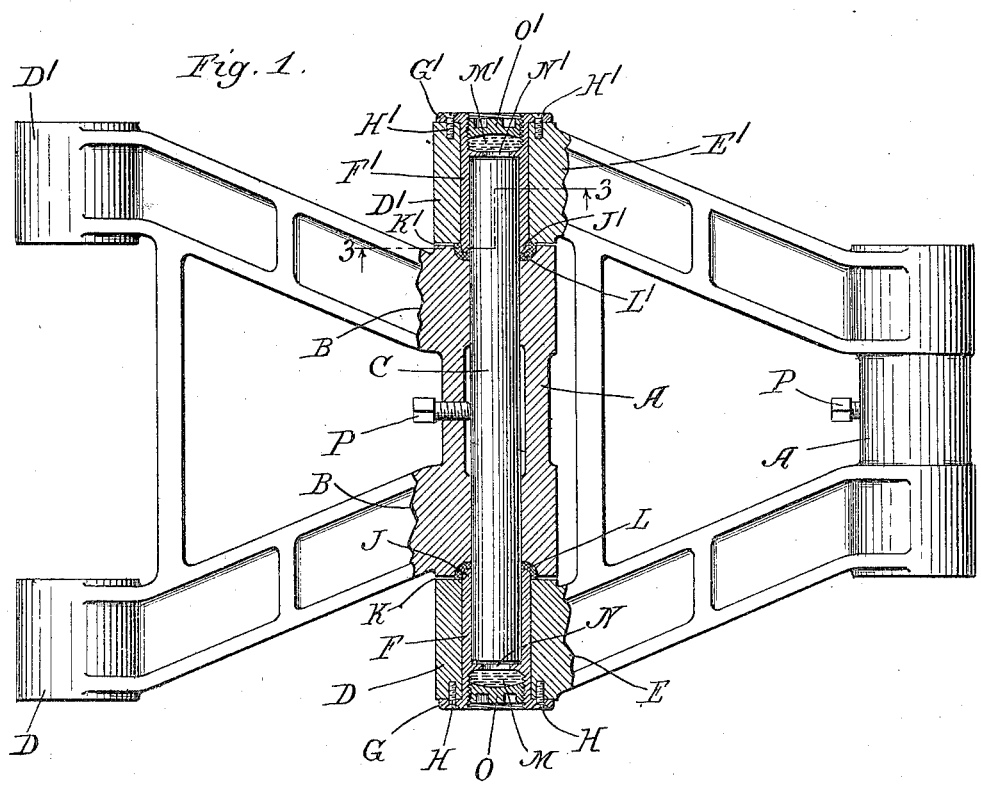

No. 680,920. Patented Aug. 20, 1901.
G. L. HOLMES.
CHAIN BELT CONNECTION.
(Application filed May 13, 1901.)
(No Model.)

Witnesses.
Edward F. Wray.
Homer L. Kraft.

Inventor.
Dr. George Lewis Holmes.
by Parker & Carter
Attorneys.

UNITED STATES PATENT OFFICE.

GEORGE LEWIS HOLMES, OF CHICAGO, ILLINOIS.

CHAIN-BELT CONNECTION.

SPECIFICATION forming part of Letters Patent No. 680,920, dated August 20, 1901.

Application filed May 13, 1901. Serial No. 60,006. (No model.)

*To all whom it may concern:*

Be it known that I, GEORGE LEWIS HOLMES, a citizen of the United States, residing at Chicago, in the county of Cook and State of Illinois, have invented a certain new and useful Improvement in Chain-Belt Connections, of which the following is a specification.

My invention relates to chain-belt-connection devices, particularly to such as are designed to do heavy and dirty work.

I have shown my invention as used in connection with chains for dredging-buckets, which are attached to, and so in a way become parts of, a chain belt. The invention is thus applicable to chain belts or connections similar to those of chain belts wherever and in whatever relation they may be used. In such connections it is common to employ a transverse pin, by which the ends of the two parts of a chain belt or other such device which are associated together are coupled or linked together, so as to have the necessary swinging or pivot motion.

In the drawings I have illustrated only the connection proper.

Figure 2:
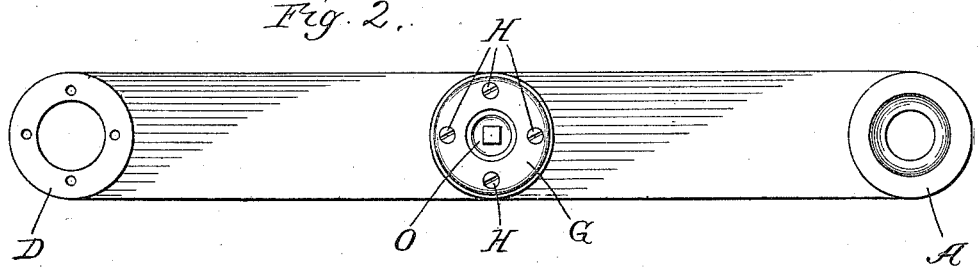
Figure 3:
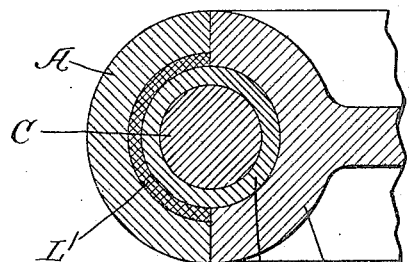

Figure 1 is a longitudinal section. Fig. 2 is an end elevation. Fig. 3 is a cross-section on line 3 3, Fig. 1.

Like parts are indicated by the same letter in all the figures.

The links are partially broken away, and the attachments thereto are therefore not shown.

A is a central link of the chain, with part broken away at B and made so as to tightly receive and securely hold the pin C, the ends of which project, as indicated. D and D' are the side links, broken away, respectively, at the points E E'. Each of these links is hollowed out to receive tightly the hard-metal bushings F F'. Each bushing is a little longer than the width of the metal link of the chain with which it is associated and has, preferably, at one end the flanges G G', through which pass the screws H H', whereby said bushings are securely attached to the side links of the chain. Each bushing projects inwardly, as indicated at J J', and is received into an annular recess which lies between the pin and the outer wall and projecting ends of the central link A, the pin being tight in the central link A and the bushings being tight in the side links D D'. The rocking or oscillating motion takes place between the projecting ends of the pin and the bushings. The central link A and the two side links D D' are connected so as to lie closely together, the breaks between them being in transverse planes beyond the transverse plane of the inner ends of the bushings, as indicated at K K'.

L L' are packing-rings at the inner ends of the bushings. Each bushing is preferably provided with an outer screw-threaded aperture M M', for grease, oil, or the like, and a smaller hole N N', leading therefrom and opening against the end of the pin. O O' are plugs screw-threaded into such screw-threaded apertures and closing the outer openings of such apertures, so as to form a kind of closed grease cup or receptacle. The dirt, grit, and the like which might otherwise enter between the pin and the bushing is prevented from so doing by reason of the fact that it must first pass down between the abutting ends of the central and side links of the chain, then turn at a right angle and travel along the bushing, then turn again at a right angle and travel along or through the packing and across the inner end of the bushing, and then turn again at a right angle and travel back between the pin and the bushing. This is practically impossible; but I further obviate the danger of such action by arranging my oiling or greasing device as indicated. By introducing a proper wrench the plug can be turned in the grease-cup, so as to force the grease toward the pin. It will travel inwardly along the outer surface of the pin toward the packing, or in a direction opposite to the supposed line of travel of the dirt, grit, &c., thus further preventing or resisting such movement of the grit. To get at the grease-space, it is only necessary to unscrew the plug. To remove the bushing, it is only necessary to remove the screws, screw a proper head into the grease-space, and apply pressure to the same. As previously stated, I have simply shown a fragment of the chain which I have employed in connection with heavy dredging-buckets and their supporting and driving links. My drawings are therefore to be taken in a sense as diagrammatic and intended to illustrate broadly and generally the features of my invention, which are obviously capable of application to various forms of such connecting devices or chains.

The chain-links are preferably of malleable iron, the bushing of hard metal, and the pins can be cut from a bar of steel, and no forging or special shaping of the pin or its associated parts is required. It may tightly fit the middle link, as indicated, or may be held in position therein by means of the set-screw P. The oiling apparatus may be greatly varied or even dispensed with where it is thought not to be necessary. The relation of the breaks between the middle and outer links with reference to the end of the bushing might be varied without departing wholly from the spirit of my invention; but I prefer to have a construction in which they are not in the same transverse plane, especially when the oiling device is not employed.

My device is perhaps more particularly applicable to conveyer-chain-link connections, for it is in such chains that the danger of injury to the bearing-surfaces is most common. I have shown but a single form of my invention. One of the important features is that the bearing-surface of the pin or other connecting device which joins the associated ends of the links shall be protected at one end by a circuitous passage-way. Another important feature of my invention is that whereby the oil is supplied at one end and caused to flow out at the other end of the connection, the end toward which it flows being the only end at which it is possible for dirt or grit to enter. The best form of my invention is that in which both of these devices, which coöperate together to produce the same result—that is, the protection of the bearing—are employed.

In the drawings I have shown the packing material as cup-shaped, and I have also shown the bushing as projecting into the middle link-section, and I have shown the packing as coming around on the outside of the bushing. This packing, of course, need not be cup-shaped and the bushing need not thus be received in an enlarged recess; but I prefer the enlarged recess and the cup-shaped packing, for if the construction be varied from that shown it may result that there will be a shearing effect exercised on the outer surface of the bushing where it projects into the recess in the middle link-section. By having this bushing smaller or the recess larger than the bushing this result is obviated and the shearing effect is brought upon the pin where it ought to be received. Having arranged the form of the parts in this manner, it is obviously best to have the cup-shaped packing. As previously suggested, that part which I have been calling the "bushing" may be made continuous with or integral with the link portion.

I have used the term "conveyer-chain link" and also the term "chain belt." I have also spoken of the use of oil. It will be understood that these and other expressions are to be taken with a broad and general significance. Any kind of chain, whether for conveyer or other purposes, and any sort of collection of links forming a chain or link belt or the like may be used. Any kind of lubricating material may also be used in lieu of oil.

I claim—

1. In a chain-link connection, the combination of two links with a pin to connect their associated ends, said pin loose in one link, and at least one set of the bearing-surfaces of such link and pin guarded by a circuitous passage-way at one end and closed at the other.

2. In a chain-link connection, the combination of two links with a pin to connect their associated ends, said pin loose in one link, and at least one set of the bearing-surfaces of such link and pin guarded by a circuitous passage-way at one end and closed at the other, and packing interposed in such passage-way.

3. In a chain-link connection, the combination of two links with a pin to connect their associated ends, said pin loose in one link, and at least one set of the bearing-surfaces of such link and pin guarded by a circuitous passage-way at one end and closed at the other, and an oil-supply at the latter end of such bearing-surfaces.

4. In a chain-link connection, the combination of two links with a pin to connect their associated ends, said pin loose in one link, and at least one set of the bearing-surfaces of such link and pin guarded by a circuitous passage-way at one end and closed at the other, an oil-supply at the latter end of such bearing-surfaces, and means for forcing such oil along the bearing-surfaces toward the first-mentioned end.

5. In a chain-link connection, the combination of two links with a pin to connect their associated ends, said pin loose in one link, a projection on one link and a recess to receive same in the other, whereby at least one set of the bearing-surfaces of such link and pin are guarded by a circuitous passage-way at one end, and means for closing such surfaces at the other end.

6. In a chain-link connection, the combination of two links with a pin to connect their associated ends, said pin loose in one link, a projection on one link and a recess to receive same in the other, whereby at least one set of the bearing-surfaces of such link and pin are guarded by a circuitous passage-way at one end, means for closing such surfaces at the other end, and packing interposed in such passage-way.

7. In a chain-link connection, the combination of two links with a pin to connect their associated ends, said pin loose in one link, a projection on one link and a recess to receive same in the other, whereby at least one set of the bearing-surfaces of such link and pin are guarded by a circuitous passage-way at one end, means for closing such surfaces at the other end, and an oil-supply at the latter end of such bearing-surfaces.

8. In a chain-link connection, the combination of two links with a pin to connect their associated ends, said pin loose in one link, a projection on one link and a recess to receive same in the other, whereby at least one set of the bearing-surfaces of such link and pin are guarded by a circuitous passage-way at one end, means for closing such surfaces at the other end, an oil-supply at the latter end of such bearing-surfaces, and means for forcing such oil along the bearing-surfaces toward the first-mentioned end.

9. In a chain-link connection, the combination of two links with a pin to connect their associated ends, a bushing in one link, said pin loose in such bushing, a projection on said bushing and a recess in the other link to receive such projection, at least one set of the bearing-surfaces of such link and pin being thus guarded by a circuitous passage-way at one end.

10. In a chain-link connection, the combination of two links with a pin to connect their associated ends, a bushing in one link, said pin loose in such bushing, a projection on said bushing and a recess in the other link to receive such projection, at least one set of the bearing-surfaces of such link and pin being thus guarded by a circuitous passage-way at one end, and packing interposed in such passage-way.

11. In a chain-link connection, the combination of two links with a pin to connect their associated ends, a bushing in one link, said pin loose in such bushing, a projection on said bushing and a recess in the other link to receive such projection, at least one set of the bearing-surfaces of such link and pin being thus guarded by a circuitous passage-way at one end, and an oil-supply at the latter end of such bearing-surfaces.

12. In a chain-link connection, the combination of two links with a pin to connect their associated ends, a bushing in one link, said pin loose in such bushing, a projection on said bushing and a recess in the other link to receive such projection, at least one set of the bearing-surfaces of such link and pin being thus guarded by a circuitous passage-way at one end, an oil-supply at the latter end of such bearing-surfaces, and means for forcing such oil along the bearing-surfaces toward the first-mentioned end.

13. In a chain-link connection, the combination of two links with a connecting device to join their associated ends, said connecting device loose in one link, and at least one set of the bearing-surfaces of such link and connecting device being guarded by a circuitous passage-way at one end.

14. In a chain-link connection, the combination of two links with a connecting device to join their associated ends, said connecting device loose in one link, and at least one set of the bearing-surfaces of such link and connecting device being guarded by a circuitous passage-way at one end, and packing interposed in such passage-way.

15. In a chain-link connection, the combination of two links with a connecting device to join their associated ends, said connecting device loose in one link, and at least one set of the bearing-surfaces of such link and connecting device being guarded by a circuitous passage-way at one end, and an oil-supply at the other end of such bearing-surfaces.

16. In a chain-link connection, the combination of two links with a connecting device to join their associated ends, said connecting device loose in one link, and at least one set of the bearing-surfaces of such link and connecting device being guarded by a circuitous passage-way at one end, and oil-supply at the other end of such bearing-surfaces, and means for forcing oil from such end along the bearing-surfaces toward the first-mentioned end.

17. In a chain-link connection, the combination of a central link with a pin secured therein and projecting at both sides thereof, a second link having two parts, one on each side of the central link, bushings, one on each part of such second link, and recesses in the central link to receive the projecting parts of said bushings.

18. In a chain-link connection, the combination of a central link with a pin secured therein and projecting at both sides thereof, a second link having two parts, one on each side of the central link, bushings, one on each part of such second link, recesses in the central link to receive the projecting parts of said bushings, and packing in said recesses at the ends of the bushings.

19. In a chain-link connection, the combination of a central link with a pin secured therein and projecting at both sides thereof, a second link having two parts, one on each side of the central link, bushings, one on each part of such second link, recesses in the central link to receive the projecting parts of said bushings, and oil-supply devices at the outer ends of the pins.

20. In a chain-link connection, the combination of a central link with a pin secured therein and projecting at both sides thereof, a second link having two parts, one on each side of the central link, bushings, one on each part of such second link, recesses in the central link to receive the projecting parts of said bushings, oil-supply devices at the outer ends of the pins, and means for forcing oil inwardly along the ends of the pins toward the packing.

21. In a chain-link connection, the combination of two links with a pin to connect their associated ends, said pin loose in one link, the bearing-surfaces of such link and pin provided at one end with an oil-supply, which tends to direct the oil from that end along the bearing-surfaces and out at the other end of such bearing-surfaces.

22. In a chain-link connection, the combination of two links with a pin to connect their associated ends, said pin loose in one link, the bearing-surfaces of such link and pin provided at one end with an oil-supply, which tends to direct the oil from that end along the bearing-surfaces and out at the other end of such bearing-surfaces, and packing at such exit end.

23. In a chain-link connection, the combination of two links with a connection device to connect their associated ends, said connection device loose in one link, the bearing-surfaces of such link and connection device provided at one end with an oil-supply, which tends to cause the oil to flow along such bearing-surfaces toward the other end thereof.

24. In a chain-link connection, the combination of two links with a connection device to connect their associated ends, said connection device loose in one link, the bearing-surfaces of such link and connection device provided at one end with an oil-supply, which tends to cause the oil to flow along such bearing-surfaces toward the other end thereof, and a packing device near such exit end.

25. In a chain-link connection, the combination of two links, one having a bushing, with a pin to connect the associated ends of said links, said pin loose in the bushing, the bearing-surfaces of such bushing and pin provided with an oil-supply at one end, whereby the oil is passed along such bearing-surfaces toward the other end.

26. In a chain-link connection, the combination of two links, one having a bushing, with a pin to connect the associated ends of said links, said pin loose in the bushing, the bearing-surfaces of such bushing and pin provided with an oil-supply at one end, whereby the oil is passed along such bearing-surfaces toward the other end, and packing near such exit end.

27. In a chain-link connection, the combination of a central link with a pin tight thereon and projecting at each side thereof, a second link having two parts, one on each side of the central link, oil devices at the ends of the pin, whereby oil is caused to flow inwardly between the bearing-surfaces of the pin and the outer link toward the inner end of such bearing-surfaces.

28. In a chain-link connection, the combination of a central link with a pin tight thereon and projecting at each side thereof, a second link having two parts, one on each side of the central link, oil devices at the ends of the pin, whereby oil is caused to flow inwardly between the bearing-surfaces of the pin and the outer link toward the inner end of such bearing-surfaces, and packing disposed near the inner ends of such bearing-surfaces.

29. In a chain-link connection, the combination of two links with a connecting device to join their associated ends, said connecting device loose in one link, and at least one set of the bearing-surfaces of such link and connecting device being guarded by a circuitous passage-way at one end, with a cup-shaped packing in such passage-way.

30. In a chain-link connection, the combination of two links with a connecting-pin to join their associated ends, one link provided with at least one part through which the pin passes and which projects into an enlarged recess on the other link, so that the shearing effect is thrown upon the pin and not upon such projecting part.

31. In a chain-link connection, the combination of two links with a connecting-pin to join their associated ends, one link provided with at least one part through which the pin passes and which projects into an enlarged recess on the other link, so that the shearing effect is thrown upon the pin and not upon such projecting part, said connecting-pin loose in one link, and the bearing-surfaces of such link and pin being guarded by a circuitous passage-way at one end.

32. In a chain-link connection, the combination of two links with a connecting-pin to join their associated ends, one link provided with at least one part through which the pin passes and which projects into an enlarged recess on the other link, so that the shearing effect is thrown upon the pin and not upon such projecting part, said connecting-pin loose in one link, and the bearing-surfaces of such link and pin being guarded by a circuitous passage-way at one end, and a cup-shaped packing about such projecting part and in such circuitous passage.

GEORGE LEWIS HOLMES.

Witnesses:
HOMER L. KRAFT,
FANNY B. FAY.